United States Patent Office 3,496,884
Patented Feb. 24, 1970

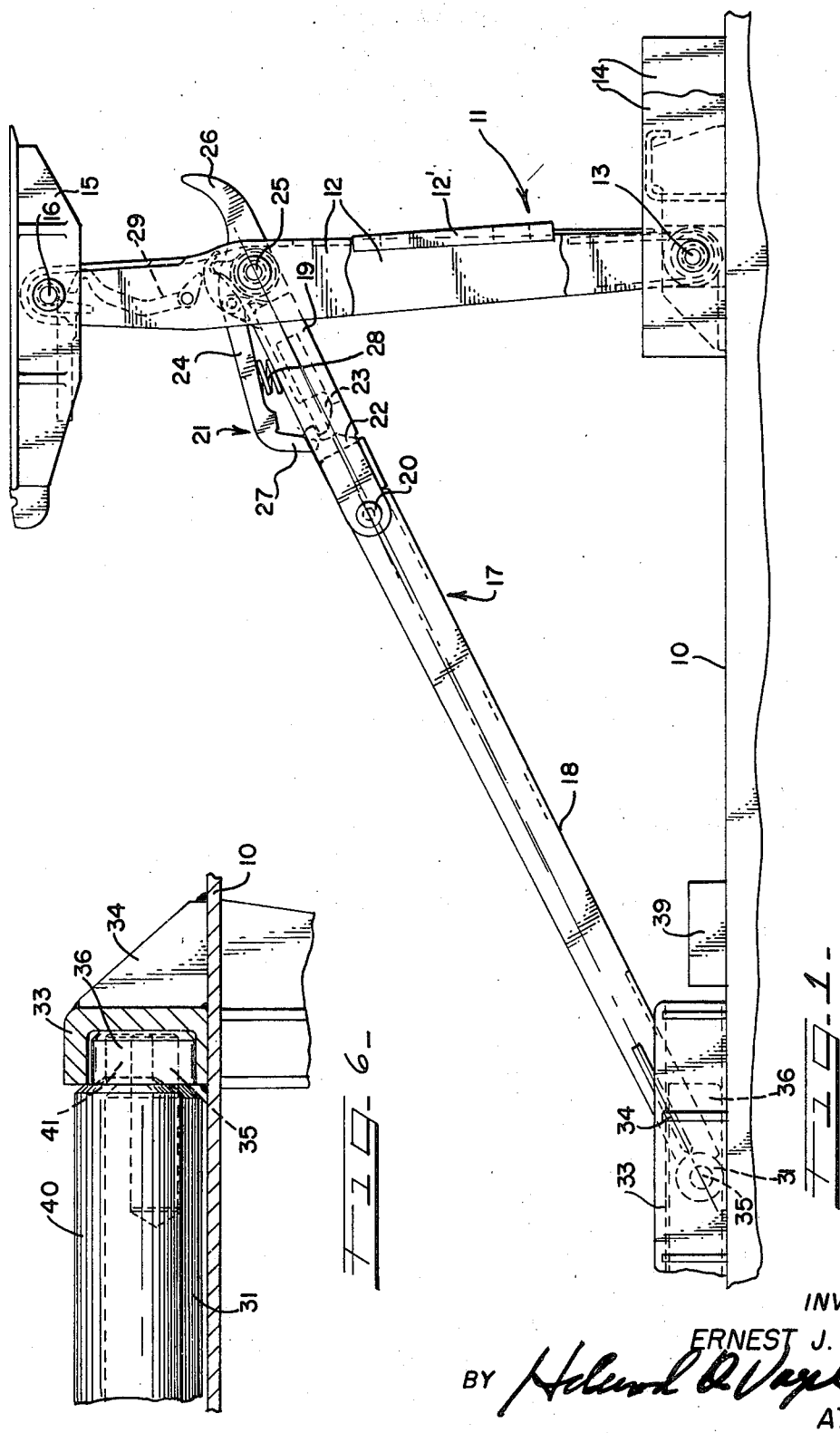

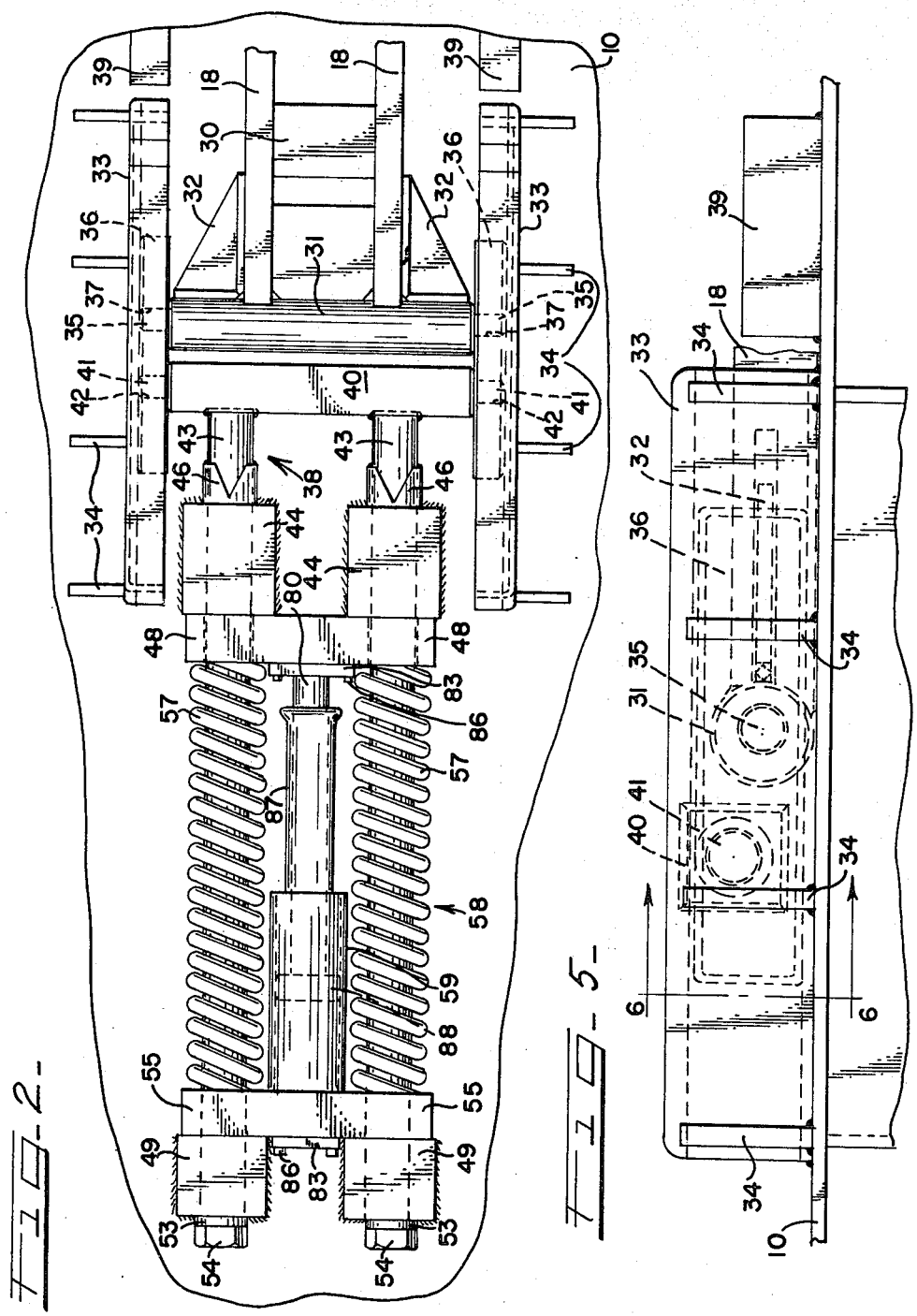

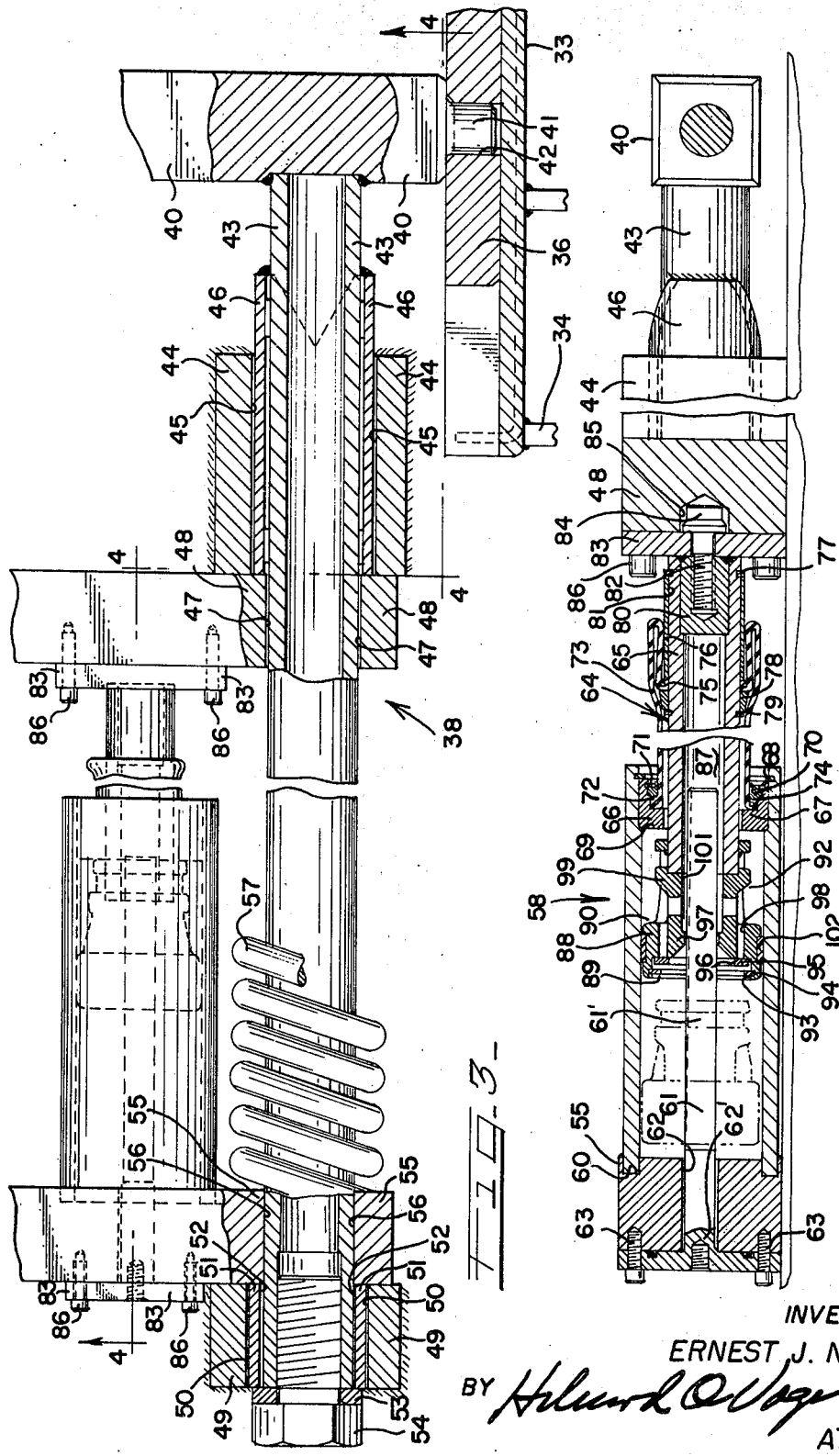

3,496,884
HYDRAULIC CUSHIONING ARRANGEMENT FOR TRAILER STANCHION
Ernest J. Nagy, Munster, Ind., assignor to Pullman Incorporated, Chicago, Ill., a corporation of Delaware
Filed Jan. 26, 1968, Ser. No. 700,976
Int. Cl. B61d 3/16; B60p 7/16; B65j 1/24
U.S. Cl. 105—368       6 Claims

ABSTRACT OF THE DISCLOSURE

A hydraulic cushioning arrangement for a stanchion pivotally supported on the deck of a railway car for supporting in its upright position a semi-trailer for trailer-on-flat-car (TOFC) operation. The diagonal strut which supports the stanchion in its erect position is connected at its lower end for pivotal and sliding movement on a pair of horizontally spaced tracks. The lower ends of the diagonal legs are also connected to a pair of longitudinally and transversely spaced tubular members slidably extending through brackets provided on the car floor, the said longitudinal tubular members having slidably positioned thereon longitudinally spaced and transversely extending slider beams which are maintained in a longitudinally spaced apart position by means of coil springs encircling the tubular beams. The slider beams are connected to a hydraulic cushion which is moved to a closed position against the action of the spring by movement of said slider beams in longitudinally opposed directions as the longitudinal beams are so moved upon pivotal movement of the stanchion in response to impact forces on the railway car.

BACKGROUND OF THE INVENTION

Field of invention

The field of invention is concerned with trailer-on-flat-car operations wherein a semi-trailer has its fifth wheel supported by means of a stanchion also known as a trailer hitch. During impacts the hitch is pivoted relative to the deck of the flat-car and a cushioning device attached to the floor of the car is effective to absorb and thereby lessen shock forces on the lading carried by the semi-trailer.

Description of prior art

Fifth wheel stanchions for railroad cars generally are provided with cushioning arrangements consisting of a plurality of rubber pads which are placed in compression by a suitable yoking arrangement during pivotal movement of the stanchion resulting from impacts on the railroad car. Such an arrangement is shown in the Candlin et al. Patent 3,183,854. Other cushioning arrangements have been provided which contain rubber elements placed in shear by suitable mounting arrangements thus relieving shocks occasioned by impacts. The present invention provides an improved cushioning arrangement whereby a hydraulic cylinder is utilized in a novel actuating or mounting arrangement in connection with a trailer stanchion.

SUMMARY

The present invention is concerned with a hydraulic cushioning arrangement including a cushion connected to a pair of longitudinally spaced slider bars in turn slidably supported on a pair of longitudinally extending tubular members. The tubular members are responsive to impacts on a railway car to slidably move in opposite directions in two pairs of longitudinally spaced bracket arrangements fixed to the car. Springs on the tubular elements urge the slider members in a spaced apart position in engagement with the guide brackets during pivotal movement of the stanchion resulting from end of car impacts whereby one of the slider members is moved in a direction closing the cushion and thus absorbing shock forces. In an impact in an opposite direction the other slider member is effective to close the cushion to effectuate this function.

BRIEF DESCRIPTION OF THE DRAWINGS

FIG. 1 is a side elevational view of a stanchion mounted on the deck of a flat-car having a diagonal strut connected to a portion of an improved cushioning arrangement;

FIG. 2 is a plan view of an improved cushioning arrangement for the stanchion disclosed in FIG. 1;

FIG. 3 is an enlarged plan view, with portions thereof broken away, of the cushioning arrangement disclosed in FIG. 2;

FIG. 4 is a cross sectional view taken substantially along the line 4—4 of FIG. 3;

FIG. 5 is a cross sectional view taken substantially along the line 5—5 of FIG. 3; and FIG. 6 is a cross sectional view taken substantially along the line 6—6 of FIG. 5.

DESCRIPTION OF THE PREFERRED EMBODIMENT

Referring now particularly to FIG. 1 the deck of a railway car is generally designated by the reference character 10. A semi-trailer support, commonly referred to as a stanchion or trailer hitch, is designated by the reference character 11. The trailer hitch 11 comprises upright struts 12 which are supported on the deck 10 for pivotal movement as indicated at 13. Brackets 14 suitably support each of the upright struts 12 on the deck 10. The upper ends of the struts 12 have pivotally connected thereto a fifth wheel plate 15 which is suitably constructed to engage a kingpin of a fifth-wheel secured to the underneath side of a semi-trailer. The fifth wheel plate 15 is suitably pivoted on the upright struts 12 as indicated at 16. A diagonal strut 17 comprises a pair of long strut sections 18 connected to a pair of short strut sections 19 by means of a pivot arrangement 20. A suitable latch mechanism generally designated at 21 is provided on the stanchion 11 to provide for jackknifing of the sections 18 and 19 thereby permitting the upright struts 12 to collapse to a collapsible non-operative position. This latch mechanism is described in detail in co-pending application U.S. Ser. No. 543,991 filed Apr. 20, 1966, now Patent No. 3,358,955.

The latch mechanism 21 briefly comprises a keeper 22 mounted on the longer sections 18 and in the operative position being engaged by a slidable latch element 23 which is supported on the short strut sections 19. A pivot arm 24 is pivoted as indicated at 25 and includes a thrust finger 26 at one end and a hook 27 at its other end. During a longitudinal force against the thrust finger 26 the pivot arm 24 is moved downwardly against the spring 28 whereupon the hook element 27 engages the latch element 23 to slide the same away from the keeper 22 permitting the sections 19 and 20 to fold or jackknife thereby causing collapse of the stanchion from the position shown in FIG. 1.

A plate 15 is suitably connected to the struts 12 and is apertured for receiving a hook element suitably mounted on a tractor and which raises the stanchion to its raised or operative position. A linkage arrangement 29 is operatively connected to mechanism (not shown) in the fifth wheel plate 15 for opening and closing a suitable kingpin lock engageable with the kingpin of a semi-trailer.

Referring now particularly to FIGS. 2 and 3 the lower ends of strut sections 18 are connected together by means of a gusset plate 30 which, with suitable gussets 34, are connected to a transverse beam 31. Positioned on opposite ends of the beam 31 are channel shaped track members 33 suitably connected to the deck 10 of the car by means of gussets 34. The beam 31 has at opposite ends thereof pins 35 which are supported on guide bars 36 by their interengagement with openings 37. The guide bars 36 are slidably disposed in the channel shaped track members 33. Stop members 39 are rigidly secured to the deck at one end of each of the channel shaped track members 33.

A cushioning arrangement is generally designated by the reference character 38 and includes a transversely extending beam 40 having at its opposite ends projecting pins 41 engaging openings 42 provided in the slide bars 36. At best shown in FIGS. 3 and 4 a pair of tubular beams are securely welded in laterally spaced relation to the beam 40 and extending longitudinally therefrom in U-shaped configuration. The beams 43 are supported for relative sliding movement on guide blocks 44 which are secured to the deck of the car in transversely spaced and aligned relation and include longitudinally extending guide bores 45. A sleeve 46 is welded to each tubular member 43 and is slidable within the guide bores 45. The tubular beams 43 extend through openings 47 provided in a slider bar 48. A pair of transversely spaced guide brackets 49 are securely fixed to the deck of a car at the opposite ends of the tubular members 43. The guide brackets 49 include bores 50 longitudinally aligned with the guide bores 45. A sleeve 51 having a bore 52 is connected to each tubular member 43 and is movable therewith in each bore. A stop plate 53 is suitably held in position on the tubular beams 43 by means of a stop nut 54 suitably threaded into each end of the tubular beam 43 thereby retaining the sleeve 51 in position. The beams 43 extend through openings 56 provided in a slider bar 55 which is substantially identical to the slider bar 48. Spring 57 positioned on the beams 43 engage the slider bars 48 and 55 to maintain them in biasing position against the guide brackets 44 and 49.

A cushioning unit 58 is disposed centrally between the beams 43. The cushioning unit 58 is of a hydraulic type comprising a cylinder 59 having one end welded into an annular groove 60 in the slider bar 55. A suitable metering pin 61 is supported in a bore 62 of the slider bar 55 and includes a base member 62¹ rigidly connected to the slider bar 55 by means of cap screws 63. Suitable longitudinal metering grooves 61¹ are provided about the periphery of the metering pin 61 in conventional fashion.

A piston and piston rod assembly 64 is reciprocally positioned within the cylinder 59. The assembly 64 includes a piston rod 65 extending through an opening 67 provided in an end closure plate 66 on the cylinder 59. The closure plate 66 is held in position by means of a snap ring 68 engaged in a recess in the cylinder 59 and is retained at its other end in an annular shoulder 69. A ring 70 is supported within the closure plate 66 by means of a snap ring 71 which firmly holds the ring 70 against the beaded end 72 of a boot 73 forming an accumulator chamber. The ring 70 maintains the beaded end 72 against an annular shoulder 74 provided within the closure plate 66. The flexible boot 73 made of suitable rubber material, is provided at its other end with a reversely turned portion provided with a bead 75 which is retained against a sleeve 76 in turn held in position on the piston rod 65 by means of a snap ring 77. A retainer ring 78 is urged against the reversely turned end and the bead portion 75 by means of a snap ring 79 supported on the rod 64.

The rod 64 is of hollow construction and a plug 80 is firmly welded into an opening 82 provided at the end of the rod. A threaded bore 81 is provided in plug 80 and a plate 83 is securely connected to the plug 80 by means of a cap screw 84 engaging the threaded bore 82. The slider bar 48 is suitably apertured as indicated at 85 for receiving the head of the cap screw 84 and screws 86 firmly connect the plate 83 to the slider bar 48 thereby rigidly securing the piston rod 64 to said slider bar.

As best shown in FIG. 4 the piston rod 64 is provided with a bore 87 extending substantially the length thereof and the said rod 64 also being provided at one end with a piston member 88. The piston member 88 is provided with a forward high pressure side 89 and on its opposite end with a low pressure side 90 said sides facing respectively a high pressure chamber 91 and a low pressure chamber 92. The piston member 88 is provided with an opening 93 on the high pressure side 89 which supports a ring 94 retaining in position a valve element 95 having an opening 96 therein. The piston member 88 also includes a metering opening 97 which cooperates with the metering pin 61 and the metering grooves 61¹ to provide a predetermined force travel characteristic as desired. Passages 98 are also provided through the piston member 88 and are in one position closed by the valve plate 95 as indicated.

The piston member 88 includes a connecting portion 99 being provided with a plurality of radially extending bores 100 communicating with the low pressure side 92 and the passages 98 as well as a bore 101 provided in the connecting portion 99. The said portion being securely connected to the end of the piston rod 64. The piston member 88 also is provided with a peripherally extending non-metallic sliding seal element 102 which is designed to prevent scoring of the smooth inner surface of the cylinder 59.

THE OPERATION

The stanchion 11 shown in FIG. 1 may be placed in a knock-down or collapsed position by actuating the finger member 26 as previously indicated. In the raised position, however, the stanchion 11 is suitably connected to the kingpin of a trailer by means of its cooperation with the fifth wheel plate 15. In over-the-road operation the car may be impacted in a manner to cause pivotal movement of the struts 12 about the pivots 13. Such pivotal movement to the left as shown in FIG. 1 causes the longitudinal beams 43 to slide to the left as shown in FIG. 3 in the guide brackets 44 and 49 whereupon the sleeves 46 engage the slider bar 48, rod 64 and piston member 88 moves through the chamber 91. During this movement the springs 57 are contracted and the slider bar 55 is fixed against the brackets 49 with the sleeves 51 moving with the beams 43 in sliding relation within the openings 50. During this movement the cushioning unit 58 functions in a conventional manner wherein fluid under high pressure flows from the chamber 91 through the metering openings 97 through the openings 100, bore 67 and into the boot or accumulator 73. During this movement the valve 95 is in closed relation to the openings 98 and only the metering passage 97 affords passage of the fluid. Thus the hydraulic cushioning action, afforded by the device, cushions the impact thereby protecting the lading carried in the semitrailer.

In the event of an impact on the other end of the car the stanchion 11 as shown in FIG. 1 moves to the right or in a clockwise fashion. In this case, referring to FIG. 3, the beams 43 are moved to the right. The slider bar 48 is in engagement with the guide brackets 44. The sleeves 51 with the tubular beams 43 are now moved to the right thereby engaging the slider bar 55 to move the same thereby compressing the springs 57. The stops 39 provided at the ends of the track 33 are effective to limit the movement of the slide members 36 as the cushioning unit substantially reaches the end of its stroke. The flow of fluid within the cylinder 59 is of course the same as previously described. During the return of the piston member 88 to its position shown in FIG. 4 the valve element 95 moves from the closed position relative to the openings 98 and fluid from the accumulator 73 and chamber 92 may return rapidly into the chamber 91 through the metering openings and passages 98.

Thus it is clear that a novel arrangement has been provided for effectively mounting a hydraulic cushion to absorb the forces of impact which are transmitted through a stanchion during certain speed impacts on a railway car. By this arrangement the cylinder and piston assembly are always in properly aligned relation despite the high forces to which they are subjected. Quick change of the metering pin may be made by means of the arrangement shown in FIG. 4 wherein the metering pin is connected directly to the slider bar 55 which closes the end of the cylinder. Also cushion replacement as well as maintenance is minimized by this construction.

Thus the operation and advantages of the invention have been fully disclosed and it must be understood that changes and modifications may be made therein without departing from the spirit of the invention.

What is claimed is:

1. For a trailer support for supporting a trailer on a railway car including a vertical strut pivotally connected to support means on the car and movable from an erect position to a collapsed position, a second strut pivotally connected to said first strut and mounted on said car for supporting said first strut in said erect position, and a fifth wheel plate carried by said strut;

a cushioning arrangement comprising a pair of longitudinally extending transversely spaced track members supported on said car, each track member having a longitudinally extending track, a guide element slidably supported on each track, means pivotally connecting said second strut to said guide elements for movement therewith, a first transversely extending beam member connected to said guide elements for sliding movement therewith, first and second longitudinally spaced pairs of guide brackets mounted on said railway car, each bracket including a longitudinally extending bore, the brackets of each pair being transversely spaced with respect to each other, a pair of transversely spaced and longitudinally extending beams connected to said first beam member and slidingly supported in said longitudinal bores, first and second transversely extending slider bars slidably supported on said longitudinally extending beams between said first and second pairs of brackets, stop means on said longitudinal beams limiting the movement of the same in one direction, hydraulic cushioning means positioned between said longitudinal beams and including a cylinder connected to one of said slider bars, a piston rod and piston assembly positioned for reciprocation within said cylinder and being connected to said other slider bar, means on said longitudinal beams engageable with said slider bars for moving the same toward one another in opposed directions thereby operating said cushioning means during pivotal movement of said vertical strut, and spring means on each longitudinal beam between said slide bars for returning said cushioning means to its nonoperating position.

2. The invention in accordance with claim 1, and said longitudinal beams comprising a pair of tubular members.

3. The invention in accordance with claim 2, and said slider bars in an apart position being resiliently retained against said guide brackets by said spring means.

4. The invention in accordance with claim 3, and said pivotal connecting means of said second strut including a second transversely extending beam member disposed substantially parallel to said first beam member.

5. The invention in accordance with claim 4, and said means on said longitudinal beams engaging said slider bars for moving the same comprising tubular collars connected to each said beam and being slidably supported in the bores of said guide brackets.

6. The invention in accordance with claim 1, and said one slider bar being connected to said cylinder to close one end thereof, said cylinder having an opening at its other end through which said piston rod extends for connection to said other slider bar, a bore through said one slider bar opening into said cylinder, a metering pin supported within said bore and extending into said cylinder, and a base member for said metering pin removably connected to said one slider member.

References Cited
UNITED STATES PATENTS 3,041,028  6/1962  McDowell _____ 248—119
3,183,854  5/1965  Candlin et al. _____ 105—368
3,190,595  6/1965  Ferris _____ 248—119

DRAYTON E. HOFFMAN, Primary Examiner

U.S. Cl. X.R.

248—119